(12) United States Patent
Walcott

(10) Patent No.: US 11,087,027 B2
(45) Date of Patent: Aug. 10, 2021

(54) PRIVACY-SAFE ATTRIBUTION DATA HUB

(71) Applicant: Marin Software Incorporated, San Francisco, CA (US)

(72) Inventor: Wister Walcott, San Francisco, CA (US)

(73) Assignee: Marin Software Incorporated, San Francisco, CA (US)

( * ) Notice: Subject to any disclaimer, the term of this patent is extended or adjusted under 35 U.S.C. 154(b) by 351 days.

(21) Appl. No.: 16/158,344

(22) Filed: Oct. 12, 2018

(65) Prior Publication Data

US 2020/0117834 A1 Apr. 16, 2020

(51) Int. Cl.
*G06F 21/62* (2013.01)
*G06Q 30/02* (2012.01)

(52) U.S. Cl.
CPC ..... *G06F 21/6263* (2013.01); *G06Q 30/0246* (2013.01); *G06Q 30/0255* (2013.01); *G06Q 30/0277* (2013.01)

(58) Field of Classification Search
CPC ............ G06F 21/6263; G06F 21/6254; G06Q 30/0277; G06Q 30/0255; G06Q 30/0242–0246
USPC .............. 713/167, 189, 193; 726/26, 27, 30; 705/14.41, 14.4, 14.42, 14.49
See application file for complete search history.

(56) References Cited

U.S. PATENT DOCUMENTS

| | | | |
|---|---|---|---|
| 9,558,280 B1* | 1/2017 | Pattan | G06Q 30/0277 |
| 9,754,292 B1* | 9/2017 | Pattan | G06Q 30/0271 |
| 2008/0097834 A1* | 4/2008 | McElfresh | G06Q 30/0244 705/7.29 |
| 2008/0255944 A1* | 10/2008 | Shah | H04L 67/306 705/14.47 |
| 2008/0306809 A1* | 12/2008 | Kwak | G06Q 30/02 705/14.54 |
| 2011/0060905 A1* | 3/2011 | Stack | G06Q 30/02 713/167 |
| 2011/0106630 A1* | 5/2011 | Hegeman | G06Q 30/0206 705/14.71 |
| 2014/0074604 A1* | 3/2014 | Castillo | G06Q 30/0267 705/14.53 |
| 2014/0089080 A1* | 3/2014 | Tajima | G06Q 30/0244 705/14.41 |
| 2015/0095145 A1* | 4/2015 | Shulman | G06Q 30/0241 705/14.53 |
| 2015/0235258 A1* | 8/2015 | Shah | G06Q 30/0242 705/14.45 |
| 2015/0379574 A1* | 12/2015 | Pattan | G06Q 30/0261 705/14.58 |
| 2017/0046745 A1* | 2/2017 | Zhu | H04W 4/21 |
| 2017/0083941 A1* | 3/2017 | Biswas | G06Q 30/0255 |
| 2019/0279257 A1* | 9/2019 | Kokernak | G06Q 30/0273 |

(Continued)

*Primary Examiner* — Saleh Najjar
*Assistant Examiner* — Khalid M Almaghayreh

(57) ABSTRACT

In an embodiment, one or more ad data sets are received at a first processor. The ad data sets may be partially encoded or encrypted to prevent the processor from viewing certain visitor information. The ad data sets are merged together around common users or order IDs. An attribution credit is applied to each advertising event, creating an attribution data set. The data in the attribution data set is aggregated according to each advertising event, and based on the aggregated results, an advertising recommendation is calculated and sent to the advertising entity.

20 Claims, 6 Drawing Sheets

(56) References Cited

U.S. PATENT DOCUMENTS

2020/0074461 A1* 3/2020 DeRosa-Grund ............................ G06Q 20/40145

* cited by examiner

| keystring_encrypted | conversions | revenue |
|---|---|---|
| EpoWH1pC0EqkCNYm0vUW | 0.5 | 83.40 |
| gktzK5MafkGYVZfzCZMz | 0.33 | 78.10 |
| g9fbRcfz6HGQKoqVHo62 | 0.25 | 40.30 |

Fig. 4

| keystring_cleartext | conversions | revenue |
|---|---|---|
| kwd_id=123 ad_id=843 rand=1 | 0.5 | 83.40 |
| kwd_id=456 ad_id=843 rand=4 | 0.33 | 78.10 |
| kwd_id=123 ad_id=558 rand=3 | 0.25 | 40.30 |

Fig. 5

| key-value | Total conversions | Total revenue |
|---|---|---|
| kwd_id=123 | 0.75 | 123.70 |
| ad_id=843 | 0.83 | 161.50 |
| Kwd_id=other | 0.33 | 78.10 |
| Ad_id+other | 0.25 | 40.30 |

Fig. 6

PRIVACY-SAFE ATTRIBUTION DATA HUB

BACKGROUND

The disclosed embodiments relate generally to processing and organizing data. In particular, the disclosed embodiments relate to systems and methods for acquiring and processing meaningful data in an anonymized and aggregated way that satisfies the data controller's privacy requirements, while providing a metric and recommendation for the effectiveness of an advertising event. Systems and methods according to various embodiments are capable of, for example, calculating a model for how advertising investments influence business models, while improving consumer privacy.

To estimate the effectiveness of advertising, advertisers typically desire to have visibility into all the ad interactions (typically, but not exclusively, clicks or views) that may have influenced a visitor on the path to a purchase. For the purposes of this application we will refer to these interactions as events. This visibility requires cooperation between advertising publishers, who show the ads and receive the event information, and an advertiser (or a vendor operating on behalf of the advertiser), who collects all the events from across different publishers, attributing a contribution value to each event. A typical approach to attribution is to assign some score or credit to each event and then roll-up (or sum, or aggregate) those contribution values across all the events generated by each ad. From this information, the advertiser can then see, in total, the contributions of each ad compared to their investments in that ad and decide if they should continue investing in that ad and to what extent. For example, an advertiser may choose to turn off an ad if it is spending money, and generating events, but if those events are not involved in any purchases. Each event may have several identifiers that tie back to aspects of the ad served, for example the image or text of the ad, the website where the ad appeared, the physical location of the visitor, keywords the visitor typed that triggered the ad, or other ad creative or targeting characteristics. We will refer to these identifiers as ad IDs. Each event may also receive credit in the form of several different metrics (conversions, revenue, time on site, or other metrics of interest to an advertiser). The goal is to aggregate the credits across the user events for each ad ID and return those sums to use in optimizing the use of advertisements.

Various models exist to attribute a value of a purchase or conversion to a given ad event. Many advertisers use or want to use a technique called multi-touch attribution, or MTA, to adjust their advertising investments and to better understand the customer journey, with the ultimate goal of maximizing purchases or conversions from the ads shown.

Thus, multi-touch attribution can be thought of as a set of rules that give variable credit or "weight" to different ads and marketing channels. More specifically, it can be considered as an equation where one side of the equation uses the customer's touch points as cost per event and its unique weight; on the other side of the equation is the conversion value.

Thus, delivering a robust MTA solution requires starting with data representing a complete set of clicks, views, or other event data. Of course, for any subsequent conversion, capturing event data does not imply that these views will necessarily be counted, or be given credit at all, nor does it imply what amount of credit is given, if any. But as a precursor to attributing credit, the event data must first be collected. Once a set of event data is collected, all the ad events leading to a conversion can be considered by assigning a credit, often a fractional credit, to each event.

The current approach to this type of cross-publisher attribution sends detailed event information from publishers to an attribution processor, where it could be linked to a user and used for purposes beyond attribution such as retargeting or user profiling. The information could include the advertisement itself, other devices for a given user, search terms a user typed, on what site they saw the ad, and the target demographic for the advertisement, including information about age, gender, race marital status, and other demographic information. Publishers want to be recognized for the contribution value of the ads they show, but they are increasingly reluctant to expose this information to others.

Unfortunately, Privacy issues can arise in the traditional MTA process because the attribution vendor can see which individual visitors interacted with which ads. Data about specific visitors, while anonymous, may potentially expose a visitor to unwanted retargeting or profiling, or expose a publisher's cross-device or cross-platform data. In addition, several changes to the law over the last few years make collecting event data more difficult. Increasingly strict privacy regulations have made view-tracking data increasingly more difficult to assemble, and ad publishers have responded by removing some measurement tags from ads displayed or published on social-media and other websites. Some web browsers have restricted by default the context and approach where visitors can be tracked. This change means that domains that visitors visit directly in large volumes, such as google.com or facebook.com, have a superior ability to track users across domains when compared to domains that exist solely for targeting and measurement (but which visitors do not generally visit on their own), such as doubleclick.net, Nielsen.com, and Neustar, among others.

Another problem presented to advertisers and ad publishers involves the ability to identify common users across different devices (e.g., different computers), and across different platforms (e.g., a laptop and a mobile device). Statistics show that, in 2018, half of visitor journeys involve visitors visiting on multiple devices. Tracking such journeys is called "person-based tracking," and favors large publishers where visitors are often logged in. By contrast, independent attribution vendors often operate on low-volume domains, and as a result do not have access to deterministic login data. Thus, following a user's journey across different ad publishers, and across different devices, can be quite challenging.

To alleviate the challenges in following a user's advertising journey, ad publishers would generally like to share data about ad events with advertisers and third-party attribution vendors, so that the ads they publish receive credit for a conversion event. Unfortunately, publishers are understandably possessive about their user and ad data, and treat their cross-device user information as proprietary. In addition, if publishers share data with each other, bad actors might be able to use that data to identify specific individuals, and even construct profiles of such individuals.

Thus, a need exists to share event data for cross-publisher, aggregated, anonymous attribution, while preserving user privacy and preventing, rather than enabling, retargeting, audience building, or profile building.

SUMMARY

In an embodiment, an ad data set is received at a first processor, where the ad data set includes encrypted ad identifiers for a plurality of advertising events, and ad information that pertains to each advertising event. The encrypted ad identifiers are then decrypted in a trusted execution environment, and an attribution data set is created by applying an attribution model to calculate a credit for each advertising event. The data in the attribution data set is aggregated according to each advertising event in the plurality of advertising events, creating an aggregated data set that includes an attribution credit value for each advertisement. Using the aggregated attribution credit value for each advertisement, an advertising recommendation is calculated and then sent to an advertising publisher.

In another embodiment, an ad data set that includes encrypted ad identifiers along with ad information for a plurality of advertising events is received at a first processor. The first processor, using at least a subset of the ad information, creates an attribution data set for at least a subset of the encrypted ad identifiers. The attribution data set is then sent to an advertising publisher. An aggregated data set is thereafter received at the first processor from the advertising publisher, the aggregated data set being based on the attribution data set sent to the advertising publisher, and that includes an aggregated attribution credit value for each advertising event. The first processor then calculates an advertising recommendation based on the aggregated attribution credit value for each advertisement.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a table displaying an example of an encrypted ad data set, according to an embodiment.

FIG. 5 is a table displaying an example of a decrypted ad data set, according to an embodiment.

FIG. 6 is a table displaying an output file representing an aggregated data set, according to an embodiment.

DETAILED DESCRIPTION

One or more of the systems and methods described herein describe a way of processing advertising data in an anonymized and aggregated way that satisfies the privacy requirements of the data controller (later referred to as an advertising publisher) and the information requirements of the data processor (later referred to as an attribution vendor). As used in this specification, the singular forms "a," "an," and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof. One skilled in the art will understand that a web page is a document on the Internet, and that a website comprises one or more web pages that are linked together. For the purposes of the present invention, the terms "ad" and "advertisement" are used interchangeably.

Figure 1:
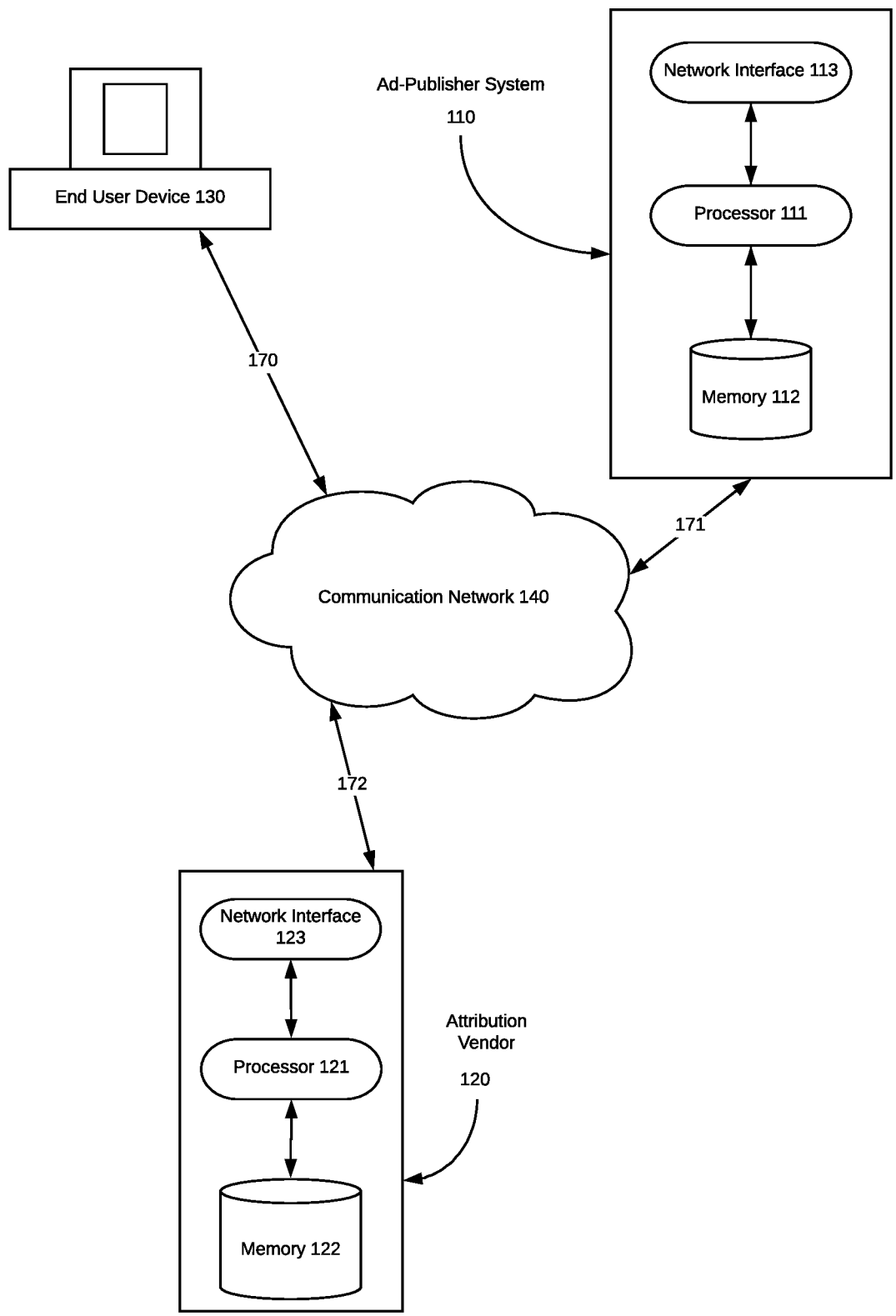
FIG. 1 is a block diagram of a system for processing, analyzing, and organizing data in an anonymized and aggregated way.

FIG. 1 is a block diagram illustrating a system for processing, analyzing, and organizing advertising data in an anonymized and aggregated way, according to an embodiment of the invention. The system comprises user terminal 130, ad publisher system 110, and ad attribution vendor 120. In an embodiment, attribution vendor 120, user terminal 130, and ad publisher system 110 are operatively coupled to one another through communication network 140 via network connection 170, which connects user terminal 130 to communication network 140, network connection 171, which connects ad publisher system 110 with communication network 140, and network connection 172, which connects attribution vendor 120 with communication network 140.

Network connections 170, 171, and 172 can be any appropriate network connection, physical, wireless, or otherwise, for operatively coupling user terminal 130, attribution vendor 110, and ad publisher system 120 to communication network 140.

Communication network 140 can be any communications network configurable to allow attribution vendor 120 to communicate with or to other network elements through communication network 140. Communication network 140 can be any network or combination of networks capable of transmitting information (e.g., data and/or signals) and can include, for example, a telephone network, an Ethernet network, a fiber-optic network, a wireless network, and/or a cellular network. In some embodiments, communication network 140 can include multiple networks operatively coupled to one to another by, for example, network bridges, routers, switches and/or gateways. For example, user terminal 130 can be operatively coupled to a cellular network, attribution vendor 120 can be operatively coupled to an Ethernet network, and ad publisher system 110 can be operatively coupled to a fiber-optic network. The cellular network, Ethernet network and fiber optic network can each be operatively coupled one to another via one or more network bridges, routers, switches and/or gateways such that the cellular network, the Ethernet network and the fiber-optic network are operatively coupled to form a communication network. Alternatively, for example, the cellular network, the Ethernet network, and the fiber-optic network can each be operatively coupled to the Internet such that the cellular network, the Ethernet network, the fiber-optic network and the Internet are operatively coupled to form a communication network.

In some embodiments, a network connection can be a wireless network connection using communication protocols such as, for example, a wireless fidelity ("Wi-Fi"™) or wireless local area network ("WLAN") connection, a wireless wide area network ("WWAN") connection, and/or a cellular connection. In some embodiments, a network connection can be a cable connection such as, for example, an Ethernet connection, a digital subscription line ("DSL") connection, a broadband coaxial connection, and/or a fiber-optic connection. In some embodiments, a user terminal, partner application and/or ad publisher system can be operatively coupled to a communication network by heterogeneous network connections. For example, a user terminal can be operatively coupled to the communication network by a WWAN network connection, a partner application can be operatively coupled to the communication network by a DSL network connection, and an ad publisher system can be operatively coupled to the communication network by a fiber optic network connection. In some embodiments, the data flowing across the network connections and communications network flow through a physical connection from one element to another.

In an embodiment, attribution vendor 120 comprises a network interface 123, a processor 121, and a memory 122. Attribution vendor is operatively coupled to user terminal 130 and ad publisher system 110 through communication network 140 via network connection 172. User terminal 130 is connected to attribution vendor 120 through communication network 140 via network connection 170, and ad publisher system 110 is operatively coupled to user terminal 130.

In an embodiment, network interface 123 can be any network interface configurable to be operatively coupled to communication network 140 via network connection 172. For example, a network interface can be a wireless interface such as, for example, a worldwide interoperability for microwave access ("WiMAX"™) interface, a high-speed packet access ("HSPA") interface, and/or a WLAN interface. A network interface can also be, for example, an Ethernet interface, a broadband interface, a fiber-optic interface, and/or a telephony interface.

In an embodiment, both the ad publisher system 110 and attribution vendor 120 can be based on any combination of hardware and software. In an embodiment, ad publisher system 110 includes network interface 113, processor 111, and memory 112. Ad publisher system 110 is operatively coupled to communication network 140 via network interface 113 and network connection 171. Network interface 113 can be any network interface configurable to be operatively coupled to communication network 140 via network connection 171. For example, a network interface can be a wireless interface such as, for example, a worldwide interoperability for microwave access ("WiMAX"™) interface, a high-speed packet access ("HSPA") interface, and/or a WLAN interface. A network interface can also be, for example, an Ethernet interface, a broadband interface, a fiber-optic interface, and/or a telephony interface.

Processor 111 is operatively coupled to network interface 113 such that processor 111 can be configured to be in communication with communication network 140 via network interface 113. In an embodiment, processor 111 (and processor 121) can be any of a variety and combination of processors, and can be distributed among various types and pieces of hardware, or even across a network. For example, a processor can be any combination of aggregation processor, attribution processor, and optimization processor, including some or all of each component. Such processors can be implemented, for example, as hardware modules such as embedded microprocessors, microprocessors as part of a computer system, Application Specific Integrated Circuits ("ASICs"), and Programmable Logic Devices ("PLDs"). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. A processor according to some embodiments includes a trusted execution environment, also known as a TEE or enclave. A TEE protects data inside the TEE from being viewed by any code, or system, or person, outside the TEE. A TEE also measures what code has run on the data inside the TEE and attests to that measurement. This measurement and attestation serves to verify that the only code to run on the data is the code that the parties expect. Examples of current TEEs may include, but may not be limited to, Intel Software Guard Extensions (Intel® SGX), AMD™ PSP, AMD™ SEE, ARM® TrustZone®, RISC MultiZone™ STEE, and Google® Asylo.

Processor 111 is also operatively coupled to memory 112 which, in an embodiment, can be used to store advertisements, advertisement-related data, web pages, searches, search results, and any other data necessary for attribution vendor 120 to perform at least a part of the invention. In an embodiment, memory 112 (and memory 122) can be a read-only memory ("ROM"); a random-access memory (RAM) such as, for example, a magnetic disk drive, and/or solid-state RAM such as static RAM ("SRAM) or dynamic RAM ("DRAM), and/or FLASH memory or a solid-data disk ("SSD), or a magnetic, or any known type of memory. In some embodiments, a memory can be a combination of memories. For example, a memory can include a DRAM cache coupled to a magnetic disk drive and an SSD.

In addition to memories 112 and 122, some embodiments include another processor-readable medium (not shown in FIG. 1) having instructions or program code thereon for performing various processor-implemented operations. Examples of processor-readable media include, but are not limited to: magnetic storage media Such as hard disks, floppy disks, and magnetic tape; optical storage media Such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices. For example, an embodiment (or parts thereof) may be implemented using HTML, Java®, C++, or other object-oriented programming language and development tools. Additional examples of program code include, but are not limited to, control signals, encrypted code, and compressed code.

In some embodiments, ad publisher system 110 can be virtual devices implemented in Software such as, for example, a virtual machine executing on or in a processor. For example, an ad publisher system or an attribution vendor can be implemented, at least in part, as a software module executing in a virtual machine environment such as, for example, a Java® module executing in a Java® Virtual Machine ("JVM"), or an operating system executing in a VMware® virtual machine. In some embodiments, a network interface, a processor, and a memory are virtualized and implemented in software executing in, or as part of, a virtual machine.

Likewise, Processor 121 is operatively coupled to network interface 123 such that processor 121 can be configured to be in communication with communication network 140 via network interface 123. Processor 121 is also operatively coupled to memory 122 which, in an embodiment, can be used to store an attribution model, attribution-model data, advertisement-related data, program code, analytics, web pages, and any other data necessary for attribution vendor 120 to perform at least a part of the invention.

In some embodiments, an attribution vendor can be a virtual device implemented in software such as, for example, a virtual machine executing on or in a processor. For example, an attribution vendor can be a software module executing in a virtual machine environment such as, for example, a Java module executing in a Java Virtual Machine ("JVM), or an operating system executing in a VMware virtual machine. In some embodiments, a network interface, a processor, and a memory are virtualized and implemented in software executing in, or as part of, a virtual machine.

User terminal 130 can be any kind of user platform, such as a desktop computer, a laptop computer, a mobile telephone, a mobile tablet, or any device that allows a user to view an advertisement.

In an embodiment, a user can use user terminal 130 to log into their user account on, for example, a social-media website. When the user logs into their account, they are served an advertisement by ad publisher system 110 via communication network 140 where it can be viewed or clicked on by the user. For the purposes of the present invention, such an event is called an advertising event, and some set or subset of the ad event details (that is, the data about the ad-viewing event) are received, via communication network 140, by ad publisher system 110, which can store the ad-event details in memory 112. Ad-event details can include, for example, the account information of the user, their name, age, gender, and other demographic information. The ad-event details can also include the advertisement itself, an identifier (encrypted, encoded, or not) that refers to the advertisement, what type of advertisement is served, the platform it is served on, the date it is served, the time it is served, the type of ad campaign, the product or other subject matter contained in the ad, whether the campaign is branded or nonbranded, and any other advertising information relevant to an ad publisher or an advertiser.

In an embodiment, for a given set of advertisements, ad publisher system 110 receives ad-event details that pertain to a single user. In an embodiment, for a given set of advertisements, ad publisher system 110 receives event details that pertain to a plurality of users. In an embodiment, ad publisher system 110, and receives data indicating that the one or more users has purchased the product that is the subject of the ad.

In an embodiment, processor 111 accesses the event details (the data set) in memory 112 and sends them, through network interface 113, and via communication network 140, to attribution vendor 120. Once received, processor 121 can process the received data set according to an attribution model, applying an attribution credit to each ad event found in the data, creating an attribution data set.

In an embodiment, processor 121 can include a trusted execution environment (or TEE), which is a secure area of a processor that guarantees code and data loaded inside to be protected with respect to confidentiality and integrity. A trusted execution environment is typically an isolated execution environment that provides security features such as isolated execution, integrity of applications executing with the trusted execution environment, along with verifiability of such execution.

In an embodiment, working within a TEE may require additional technical considerations. These considerations may include the following:

The TEE may implement its own authentication and encryption separate from the attribution processor. This may be enabled with the use of asymmetric encryption such as used within transport layer security (TLS) or secure sockets layer (SSL), to encrypt the data itself, or to exchange symmetric keys for further data exchange.

The TEE may have and serve a certificate from a third party to vouch for its identity.

Because of limited working memory within the TEE, the TEE may have to split apart the processing work in various ways, for example saving partial work out to the main (non-TEE) memory of the broader computer. If this happens, the partial work is re-encrypted to prevent viewing by non-authorized code or users.

Once the credit for each ad event is applied, in an embodiment, the attribution data set is sent from processor 121, through communication network 140, to ad-publisher system 110. Ad-publisher system then aggregates the data across a plurality of users, and then sorts and processes the aggregated data by ad event to provide an aggregated attribution credit for each ad event. In an embodiment, the aggregated data is packaged into an aggregated data set and then sent back, via communications network 140, to attribution vendor 120, for further processing. In an embodiment, processor 121 receives the aggregated data set and, based on the aggregated data set, calculates an advertising recommendation that can then be sent back, via communication network 140, to a relevant party, such as an ad publisher, or an advertiser, or another interested party.

In an embodiment, once the attribution credit for each ad event is applied by processor 121, it is further processed by processor 121 which aggregates the data across the plurality of users, and then sorts and processes the aggregated data by ad event to provide an aggregated attribution credit for each ad event. Processor 121, in an embodiment, then further processes the data to create an advertising recommendation that is then sent to an interested third party such as an ad publisher, an advertiser, or other party.

Figure 2:
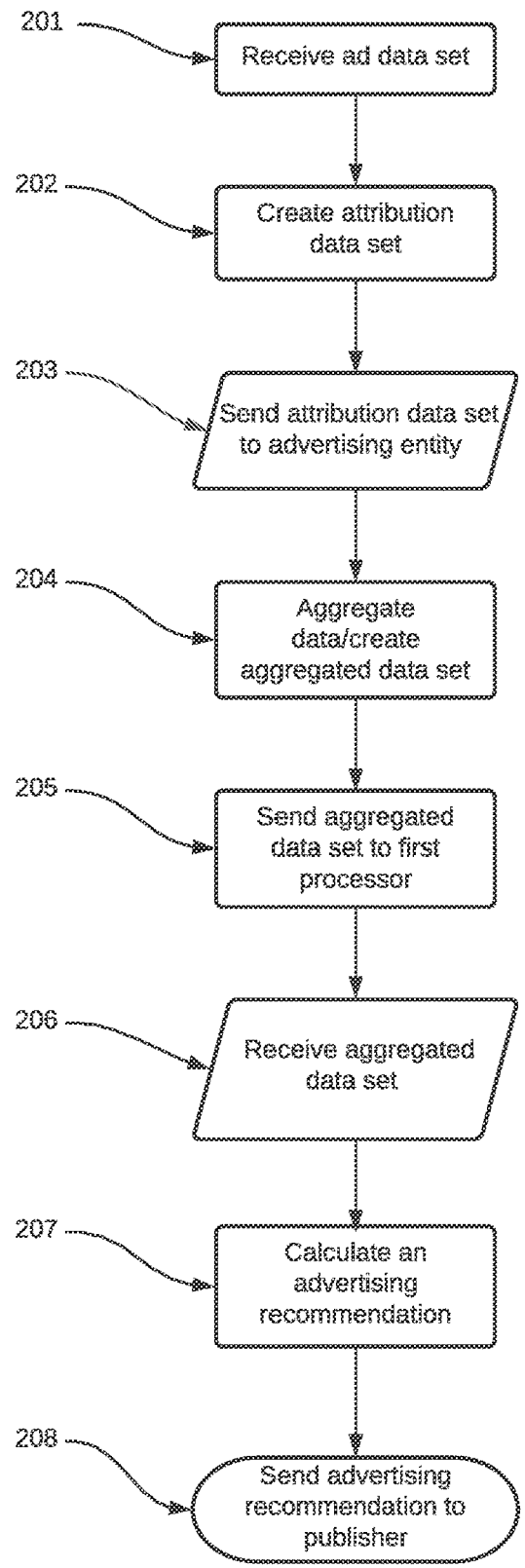
FIG. 2 is a flow chart of a process for calculating and sending an advertising recommendation to a publisher based on a remote analysis of encoded or encrypted data, according to an embodiment of the invention.

FIG. 2 is a flow chart of a process for calculating and sending an advertising recommendation to a publisher, according to an embodiment of the invention. In an embodiment, the process in FIG. 2 is implemented by at least a subset of components in FIG. 1. At 201, a first processor receives an ad data set that includes information about advertising events. In an embodiment, the information is about advertising events that have been viewed by at least one user who has been served an ad or a plurality of ads. In an embodiment, the information is about advertising events that pertain to a product that has been purchased by the user. In an embodiment, the advertising events can include different advertisements that have been served on one or more platforms. In an embodiment, the advertising events can include views of the same advertisements, but at different times, across one or more platforms. In yet another embodiment, the advertising events can include a view of or a click on any combination of advertisements served at any combination of times, on any combination of platforms.

For the purposes of the present invention, the term platform means a type of device capable of receiving a broadcast or connecting to a network, and then displaying a served ad. Examples of different platforms include, but are not limited to, personal computers, laptops, mobile or cellular telephones, electronic tablets, electronic books, tablets, and any other appropriate device.

In an embodiment, the event data set includes an ad identifier that identifies the particular ad that was served or published. For example, the ad may be text, still image, or video, or a combination of those elements. In an embodiment, the event data set further includes information about when the ad was served, and what keyword or placement or user action or attribute triggered the ad to be shown to that user.

In an embodiment, the ad data set, or a subset of the ad data set, is encoded or encrypted before it is received at the first processor. In an embodiment, some elements may be encoded or encrypted such that they can be used or understood only by the publisher. For example, instead of using an ad ID known to the processor, the publisher would substitute a replacement ad ID that the publisher can look up later. This prevents the processor from looking up the targeting details of that ad to infer attributes about the user such as their race or gender. In an embodiment, the encoding is "salted" with a timestamp, order ID, or some other factor so that the processor cannot infer that two ads appearing for different users or at different times are the same ad. In an embodiment, some deprecisioned or higher-level information about the ads are retained, such as the overall objective or theme for the ad. In an embodiment, order ID is retained. This ID can be used by the processor to combine these ad events with events from other publishers. All other data elements can be removed, such as User ID, browser signature, and IP address. The term encoded in this context means that the ad information in the data set includes information that is processed in a way that allows the first processor to uniquely identify the ad to the ad publisher later, but uses private IDs that are known only to the ad publisher. For example, the IDs could be combined with the hour of the ad event and then encrypted using a symmetrical encryption algorithm such as 3DES or AES. In an embodiment, the IDs could be replaced with a sequence number, whereby the publisher would record the mapping of the original ad IDs with the sequence number so as to decode them later. In an embodiment, such data includes data representing at least one of time, date, and IP address of target, but before being sent to the first processor, the data has been subjected to a depreciation model, thus reducing the precision with which the data has been collected, denying the processor the ability to identify the person to whom the ad was served. For example, if an advertisement includes a timestamp, 11:21 am may be converted to 11:20 am, 11:15 am, 11:30 am, 11:00 am, or noon under different precision targets. This prevents the processor from associating conversion events with specific web visits by using the time ID. In an embodiment, the precision target is selected by the publisher based on the data volumes and the anonymity required.

At 202, the first processor creates an attribution data set. In an embodiment, an attribution data set is created by merging the ad data sets received from each of one or more publishers and applying to each ad event in the received data (or at least to a subset of ad events) an attribution credit based on a predetermined attribution model. One skilled in the art will appreciate that any practicable attribution model can be used to create the attribution data set.

In an embodiment, the ad identifiers in the ad data set are encoded or encrypted, and at least a subset of the remaining data in the ad data set is unencoded or decrypted, as the case may be. In other words, the ad identifier can be encoded or encrypted such that the first processor cannot determine which ad is referred to by the ad identifier, while the remaining data is unencoded or unencrypted so that the first processor has sufficient information about each ad event to allow the first processor to provide an attribution credit to each ad event, thus creating the attribution data set.

At 203, the attribution data set created by the first processor is sent to the relevant aggregation processor. In an embodiment, the aggregation processor is an ad publisher. In an embodiment, the aggregation processor can be an attribution processor.

Once the data is decrypted, at 204, the data is aggregated among a user or users, creating an aggregated data set that organizes the data by ad identifier. In an embodiment, the aggregated data set includes, for each ad element or ad identifier (hereafter referred to as an ad ID), the total of all the attribution credits that have been aggregated over a plurality of users.

Provided a sufficient quantity of users exists, the act of aggregation typically anonymizes the data. If an insufficient quantity of users exists for a particular ad ID, the credits for that ad ID will be placed into a "catch-all" category. The aggregated data set is readable by the optimization processor, and is then sent to the optimization processor at 205.

At 206, the aggregated data set is received at the optimization processor, which can use the data in a number of ways. In an embodiment, at 207, the aggregated data set is divided by the historical spending on that ad to calculate a return on investment for that ad or another advertising recommendation, which can include at least one of the following recommendations: which ad events to use or to not use to increase the likelihood of a conversion, which platform on which to serve the ad to increase the likelihood of a conversion, what season, day, and/or time to serve the ad to increase the likelihood of a conversion, what demographic to serve the ad to, whether the ad should be branded or unbranded, where to place ads on a web page, how often to serve the ad, and any other factor that can be used to improve the financial performance of that ad.

Once the advertising recommendation is calculated, at 208, it can be sent back to the advertising publisher for implementation. For example, the recommendation can be sent to an ad publisher telling the ad publisher which advertisements to turn off, discard, or abandon, or which advertising campaign should be given prominence at a certain time.

Figure 3:
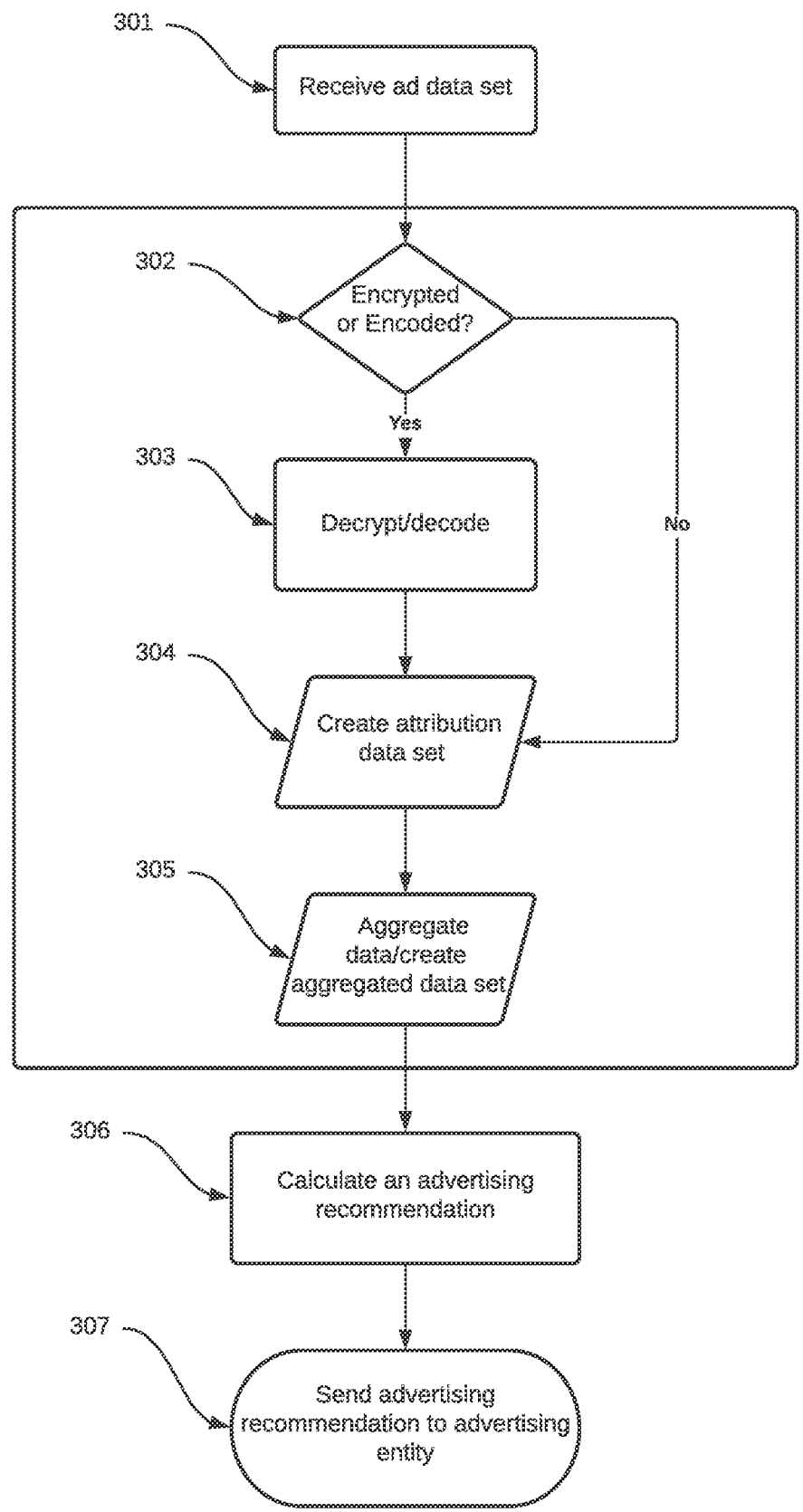
FIG. 3 is a flow chart of a process for calculating and sending an advertising recommendation to a publisher, based on a local analysis of encoded or encrypted data, according to an embodiment of the invention.

FIG. 3 is a flow chart of a process for calculating and sending an advertising recommendation to a publisher, according to an embodiment of the invention. In an embodiment, the process in FIG. 3 is implemented by at least a subset of components in FIG. 1.

At 301, an ad data set is received. In an embodiment, the ad data set is received at a first processor from an advertising entity such as an ad publisher. The ad data set includes an ad identifier that identifies the particular ad that was served or published to one or more users. In an embodiment, the ad data set includes information about an advertisement of a product that was purchased by a user. In addition to the ad identifier, the ad data set further includes ad information, that is, information about the ad to identify when the ad was served, including day, date, and time, who the ad was served to, the demographic of the receiver of the ad, the type of ad campaign the ad belongs to, and whether the ad is branded or nonbranded.

In an embodiment, the ad data set, or a subset of the ad data set, is encoded or encrypted before it is received at the first processor. In an embodiment, the ad data set is encoded or encrypted by the first processor. The ad data set may include one or more ad identifiers for each ad event, for example audience, device, ad text, targeting such as search term, geography, or search history. There may also be one or more labels about the ad event, identifying for example a demographic target or the high-level objective. The data set may also include data representing the time and date of the event. In an embodiment the ad data set is encoded or encrypted. In another embodiment, a subset of the ad data set is encoded or encrypted.

At 302, in an embodiment, the first processor determines if the data in the ad data set, or any subset of data in the ad data set, is encoded or encrypted. If yes, the processor decodes or decrypts the data, at 303, and then further processes the data at 304 to create an attribution data set in which, using an attribution model, at least one ad event in the data set is assigned an attribution credit that represents a value of the ad event according to an attribution model.

In an embodiment, the ad publisher encrypts all data elements in the data set such that only a processor TEE can read the data. Using the TEE and other processing resources, the processor merges the data set with similar data sets from other publishers to build a consolidated data set of ad events for converting users. The processor then applies the attribution model and aggregates the credit. The aggregated total credit is communicated from the TEE to the processor using decrypted or cleartext Ad IDs and totals. Thus, at 303, the data is decrypted in a trusted execution environment.

In an embodiment, decryption 303 can occur later in the process, provided that the first processor has enough information to create the attribution data set. Once the attribution data set is calculated, any data showing a user interaction, or showing any other data that can be used to identify the user, can be discarded. In an embodiment, the original data set, or any subset thereof, can be discarded at any time after it is decrypted.

In an embodiment, the ad data set includes at least one encoded or encrypted ad identifier, and wherein at least a subset of the remaining data in the ad data set is unencoded or unencrypted. In an embodiment, the ad data set includes at least one encoded or encrypted ad identifier, and further includes encoded or encrypted data that is related to each encoded or encrypted ad event.

At 305, the attribution data set is processed to create an aggregated data set, wherein the data for each ad event is combined such that each ad element (as uniquely distinguished by a unique ad ID) has a value that is the aggregated value of all the ad events for that ad element, Examples of ad elements could include, but are not limited to, a specific geography (for example, Chicago); a specific keyword target (for example, "red shoes"); or a specific ad text ("Sale on shoes").

Once the aggregated data set is calculated, it is used to calculate an advertising recommendation, at 306, which is then sent to an advertising publisher at 307.

In an embodiment, aggregates are computed within a confidential environment such as a trusted execution environment that the attribution processor cannot penetrate; on a data set of ad events provided by the advertising entity. In an embodiment; the aggregation step will further aggregate any ad IDs that, after aggregation, did not receive credit from at least a specified number of different ad events, for example 2 or 3 ad events. For the purposes of the present invention, "further aggregate" means that if there were for example, ad IDs a; b, and c, each of which had only one total conversion to their credit, then the system would aggregate them together as "other" with a total of 3. In an embodiment steps 302 through 306, or any subset thereof, are performed in a TEE or other trusted execution environment.

FIG. 4 is a table displaying an example of an encrypted ad data set, according to an embodiment. In an embodiment, the input file includes a plurality of rows of encrypted data, each row representing both the ad ID associated with an advertising event, along with a user ID for a user associated with that advertising event. The input file, in an embodiment, includes at least three columns, with column 1 being the encrypted keystring, column 2 representing the conversion value of that row's advertising event, and column 3 representing the revenue associated with each conversion. For the purposes of the present invention, a keystring, is a collection of one or more ad IDs along with their associated values.

FIG. 5 is a table displaying an example of a decrypted ad data set, according to an embodiment. In an embodiment, as can be seen in the table in FIG. 5, each row includes a cleartext version of a user ID and an ad ID.

FIG. 6 is a table displaying an output file representing an aggregated data set, according to an embodiment. The aggregated data set in this embodiment comprises one row per key-value combination found in the ad data set, with the summed metric for each key value. In this embodiment, each row contains: key and value, along with metrics totals (total conversions and total revenue), with one metric displayed per field.

In an embodiment, the first processor can provide to the publisher a public key, to be used for encrypting the data to be received by the first processor. The advertising entity can validate the authenticity of the public key as desired. In an embodiment, the first processor receives from the publisher a public key to be used for decrypting the data to be received by the first processor. The first processor validates the authenticity of the public key as desired.

One skilled in the art will understand, in the context of embodiments of the invention, the term "a combination of" includes zero, one, or more, of each item in the list of items to be combined.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A method, comprising:
   receiving at a first processor, an ad data set that includes encrypted ad identifiers for a plurality of advertising events, and that further includes ad information that pertains to each advertising event;

decrypting the encrypted ad identifiers in a trusted execution environment, wherein the trusted execution environment implement its own authentication and encryption separate from the first processor;

applying to each advertising event in the plurality of advertising events, an attribution credit based on an attribution model, creating an attribution data set in the trusted execution environment;

aggregating the data in the attribution data set according to each advertising event in the plurality of advertising events, creating an aggregated data set that includes an aggregated attribution credit value for each advertisement in the trusted execution environment;

calculating at the first processor an advertising recommendation, based on the aggregated attribution credit value for each advertisement; and sending the calculated advertising recommendation to an advertising entity.

2. The method of claim 1, wherein the ad data set is received from an ad publisher.

3. The method of claim 1, wherein the ad information that pertains to each advertising event includes at least one of a type of the advertising event, an ID for a user who viewed the advertisement, the date and time of the event, an ID for the advertisement itself, an ID for targets for the advertisement, and a campaign type.

4. The method of claim 3, wherein the campaign type includes at least one of a branding campaign, a non-branding campaign, a display campaign, a map campaign, and a mobile campaign.

5. The method of claim 1, wherein the plurality of advertising events includes at least one of a user click on an advertisement, and a user view of an advertisement.

6. The method of claim 1, wherein the plurality of advertising events pertains to a product purchased by a user.

7. The method of claim 1, wherein the advertising recommendation includes at least one of: when to serve an ad, which ad to serve, how prominently to display an ad, where to display an ad, and to which users to display an ad.

8. A method, comprising:
receiving at a first processor, an ad data set that includes encrypted ad identifiers for a plurality of advertising events, and that further includes ad information that pertains to each advertising event;

decrypting the encrypted ad identifiers in a trusted execution environment, wherein the trusted execution environment implement its own authentication and encryption separate from the first processor;

creating, at the first processor and in the trusted-execution environment, an attribution data set for at least a subset of the encrypted ad identifiers, the attribution data set based on at least a subset of the ad information that pertains to each advertising event; sending the attribution data set to an advertising entity;

receiving at the first processor, from the advertising entity, an aggregated data set that includes an aggregated attribution credit value for each ad identifier, the aggregated data set based on the attribution data set sent to the advertising publisher entity;

calculating an advertising recommendation based on the aggregated attribution credit value for each ad identifier; and sending the calculated advertising recommendation to an advertising publisher.

9. The method of claim 8, wherein the received aggregated data set is readable by the first processor.

10. The method of claim 8, wherein the ad data set is received from an ad publisher.

11. The method of claim 8, wherein the ad information that pertains to each advertising event includes at least one of: an ID for a user who viewed the advertisement, an approximate time of an advertising event, content of the advertisement, a targeting for the advertisement, and a campaign type for the advertisement.

12. The method of claim 11, wherein the campaign type includes at least one of a branding campaign, a non-branding campaign, a display campaign, a map campaign, and a mobile campaign.

13. The method of claim 8, wherein the plurality of advertising events includes at least one of a user click on an advertisement and a user view of an advertisement.

14. The method of claim 8, wherein the plurality of advertising events pertains to a product purchased by a user.

15. The method of claim 8, wherein the advertising recommendation includes at least one of when to serve an ad, which ad to serve, and which ad to discard.

16. A non-transitory computer-readable medium storing program code, the program code configured to, when executed:
receive at a first processor, an ad data set that includes encrypted ad identifiers for a plurality of advertising events, and that further includes ad information that pertains to each advertising event;

decrypt the encrypted ad identifiers in a trusted execution environment, wherein the trusted execution environment implement its own authentication and encryption separate from the first processor;

apply to each advertising event in the plurality of advertising events, an attribution credit based on an attribution model, creating an attribution data set;

aggregate the data in the attribution data set according to each advertising event in the plurality of advertising events, creating an aggregated data set that includes an aggregated attribution credit value for each advertisement;

calculate at the first processor an advertising recommendation, based on the aggregated attribution credit value for each advertisement; and send the calculated advertising recommendation to an advertising publisher.

17. The non-transitory computer-readable medium of claim 16, wherein the ad information that pertains to each advertising event includes at least one of a type of advertisement, an ID for a user who viewed the advertisement, the advertisement itself, a target demographic for the advertisement, and a campaign type.

18. The non-transitory computer-readable medium of claim 17, wherein the campaign type includes at least one of a branding campaign, a non-branding campaign, a display campaign, a map campaign, and a mobile campaign.

19. The non-transitory computer-readable medium of claim 16, wherein the plurality of advertising events includes at least one of a user click on an advertisement, and a user view of an advertisement.

20. The non-transitory computer-readable medium of claim 16, wherein the advertising recommendation includes at least one of when to serve an ad, which ad to serve, and which ad to discard.

* * * * *